United States Patent
Zhang

(10) Patent No.: US 11,461,984 B2
(45) Date of Patent: Oct. 4, 2022

(54) METHOD AND APPARATUS FOR MULTI-USER COLLABORATIVE CREATION, AND STORAGE MEDIUM

(71) Applicant: Baidu Online Network Technology (Beijing) Co., Ltd., Beijing (CN)

(72) Inventor: Yan Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/507,244

(22) Filed: Jul. 10, 2019

(65) Prior Publication Data

US 2019/0333287 A1    Oct. 31, 2019

(30) Foreign Application Priority Data

Aug. 27, 2018   (CN) .......................... 201810981849.X

(51) Int. Cl.
| | |
|---|---|
| *G06T 19/20* | (2011.01) |
| *G06F 3/01* | (2006.01) |
| *G06F 3/048* | (2013.01) |
| *G06T 19/00* | (2011.01) |

(52) U.S. Cl.
CPC .............. *G06T 19/20* (2013.01); *G06F 3/017* (2013.01); *G06T 19/006* (2013.01); *G06T 2219/024* (2013.01)

(58) Field of Classification Search
CPC ................................ G06T 19/20; G06F 3/048
See application file for complete search history.

(56) References Cited

U.S. PATENT DOCUMENTS

| | | | | |
|---|---|---|---|---|
| 2010/0121915 A1* | 5/2010 | Wang | ...................... | A63F 13/12 709/203 |
| 2011/0202834 A1* | 8/2011 | Mandryk | ............ | G06F 3/04883 715/701 |
| 2012/0172119 A1* | 7/2012 | Kelly | ...................... | A63F 13/00 463/31 |
| 2013/0120368 A1* | 5/2013 | Miller | ..................... | G06T 15/00 345/419 |
| 2014/0223099 A1* | 8/2014 | Kidron | ................ | G06F 12/0806 711/118 |

(Continued)

FOREIGN PATENT DOCUMENTS

| | | |
|---|---|---|
| CN | 1921443 A | 2/2007 |
| CN | 105190604 A | 12/2015 |

*Primary Examiner* — Yi Yang
(74) *Attorney, Agent, or Firm* — Harness, Dickey & Pierce, P.L.C.

(57) ABSTRACT

The present application provides a method and apparatus for multi-user collaborative creation, and a storage medium, where the method includes: obtaining, by a second terminal, a three-dimensional (3D) creation created by a first creator, the 3D creation including at least one creation element, obtaining creation information corresponding to each creation element according to the 3D creation, and determining the first creator corresponding to each creation element according to the creation information corresponding to each creation element. In the technical solution, the second terminal may conveniently and quickly determine the first creator corresponding to each creation element in the 3D creation, which simplifies the communication process for the creation and improves the creation efficiency.

7 Claims, 8 Drawing Sheets

Receiving a creation obtaining request transmitted by a second terminal, the creation obtaining request including a 3D creation identifier and a second creator identifier — 71

Determining whether the 3D creation identifier has an association relationship with the second creator identifier — 72

Transmitting a 3D creation corresponding to the 3D creation identifier to the second terminal when the 3D creation identifier has the association relationship with the second creator identifier — 73

(56) References Cited

U.S. PATENT DOCUMENTS

| | | | |
|---|---|---|---|
| 2014/0289645 A1* | 9/2014 | Megiddo | G06F 3/048 |
| | | | 715/753 |
| 2015/0146925 A1* | 5/2015 | Son | G06F 3/017 |
| | | | 382/103 |
| 2015/0215390 A1* | 7/2015 | Yerli | G06F 16/93 |
| | | | 715/753 |
| 2018/0130259 A1* | 5/2018 | Leefsma | G06Q 10/101 |
| 2018/0284959 A1* | 10/2018 | Alphin, III | G06F 11/3438 |

* cited by examiner

METHOD AND APPARATUS FOR MULTI-USER COLLABORATIVE CREATION, AND STORAGE MEDIUM

CROSS-REFERENCE TO RELATED APPLICATION

This application claims priority to Chinese Patent Application No. 201810981849.X, filed on Aug. 27, 2018, which is hereby incorporated by reference in its entirety.

TECHNICAL FIELD

The present application relates to the field of computer technologies, and in particular, to a method and apparatus for multi-user collaborative creation, and a storage medium.

BACKGROUND

At present, a three-dimensional (3D) creation is based on 3D modeling software on a computer, and the creator needs to do drawings of point-line-plane on an application of a terminal device.

In the prior art, an existing three-dimensional creation is typically completed independently by one creator, and the completed creation is saved on the creator's personal computer. When there are a plurality of persons collaboratively working on the creation, each creator typically delivers an unfinished creation work offline sequentially, and supplements or modifies the work on the basis of the previous creator.

However, in the above multi-user collaborative creation scheme, since the creation works can only be delivered offline, one creator cannot determine the creation content of other creators in time, resulting in a complicated communication process and a low creation efficiency.

SUMMARY

The present application provides a method and apparatus for multi-user collaborative creation, and a storage medium to overcome the problem of a low creation efficiency in a multi-user collaborative creation scheme.

The first aspect of the present application provides a method for multi-user collaborative creation, where the method is applied to a second terminal, the method including:

obtaining a 3D creation created by a first creator, the 3D creation including at least one creation element;

obtaining creation information corresponding to each creation element according to the 3D creation, the creation information including a first creator identifier; and determining the first creator corresponding to the each creation element according to the creation information corresponding to the each creation element.

Optionally, in a possible implementation manner of the first aspect, the obtaining a 3D creation created by a first creator includes:

transmitting a creation obtaining request to a server, the creation obtaining request including a 3D creation identifier and a second creator identifier; and receiving the 3D creation transmitted by the server according to the 3D creation identifier and the second creator identifier.

Optionally, in another possible implementation manner of the first aspect, the obtaining creation information corresponding to each creation element according to the 3D creation includes:

displaying the 3D creation in a 3D space by an augmented reality (AR) approach;

locating the creation element of the 3D creation, and determining the creation information corresponding to the each creation element according to information displayed in the 3D space.

Optionally, in another possible implementation manner of the first aspect, after the determining the first creator corresponding to the each creation element according to the creation information corresponding to the each creation element, the method further includes:

transmitting a creation modification request to a first terminal corresponding to the first creator, the creation modification request including a creation element identifier, a modification scheme and a second creator identifier;

receiving a creation modification response returned by the first terminal according to the creation modification request, the creation modification response including approval of modification or disapproval of modification; and modifying the creation element corresponding to the creation element identifier according to the modification scheme when the creation modification response is the approval of modification.

The second aspect of the present application provides a method for multi-user collaborative creation, where the method is applied to a first terminal, the method including:

obtaining a gesture action of a first creator in a 3D space;

determining at least one creation element according to the gesture action, the creation element including a point, a line and a plane;

generating a 3D creation according to all the creation element; and uploading the 3D creation to a server.

Optionally, in a possible implementation manner of the second aspect, before the generating a 3D creation according to all the creation element, the method further includes:

obtaining creation information corresponding to each creation element, the creation information including a first creator identifier;

associating the creation information corresponding to the each creation element with the creation element to obtain each associated creation element;

correspondingly, the generating a 3D creation according to all the creation element includes:

generating the 3D creation according to all the associated creation element.

Optionally, in another possible implementation manner of the second aspect, before the uploading the 3D creation to a server, the method further including:

displaying the 3D creation in the 3D space by an augmented reality (AR) approach.

Optionally, in another possible implementation manner of the second aspect, after the uploading the 3D creation to a server, the method further includes:

receiving a creation modification request transmitted by a second terminal, the creation modification request including a creation element identifier, a modification scheme and a second creator identifier;

determining whether the modification scheme is appropriate according to the creation element identifier and the second creator identifier, to obtain a determined result;

feeding a creation modification response back to the second terminal according to the determined result, the creation modification response including approval of modification or disapproval of modification.

The third aspect of the present application provides a method for multi-user collaborative creation, where the method is applied to a server, the method including:

receiving a creation obtaining request transmitted by a second terminal, the creation obtaining request including a 3D creation identifier and a second creator identifier;

determining whether the 3D creation identifier has an association relationship with the second creator identifier;

transmitting a 3D creation corresponding to the 3D creation identifier to the second terminal when the 3D creation identifier has the association relationship with the second creator identifier.

Optionally, in a possible implementation manner of the third aspect, before the receiving a creation obtaining request transmitted by a second terminal, the method further includes:

receiving the 3D creation uploaded by a first terminal;

obtaining all creator identifiers which each have an association relationship with the 3D creation identifier; and storing the association relationship between the 3D creation identifier and each creator identifier.

The fourth aspect of the present application provides an apparatus for multi-user collaborative creation, where the apparatus is applied to a second terminal, the apparatus including an obtaining module and a processing module;

the obtaining module is configured to obtain a 3D creation created by a first creator, the 3D creation including at least one creation element; and obtain creation information corresponding to each creation element according to the 3D creation, the creation information including a first creator identifier; and the processing module is configured to determine the first creator corresponding to the each creation element according to the creation information corresponding to the each creation element.

Optionally, in a possible implementation manner of the fourth aspect, that the obtaining module is configured to obtain a 3D creation created by a first creator is specifically:

the obtaining module is specifically configured to transmit a creation obtaining request to a server, the creation obtaining request including a 3D creation identifier and a second creator identifier; receive the 3D creation transmitted by the server according to the 3D creation identifier and the second creator identifier.

Optionally, in another possible implementation manner of the fourth aspect, that the obtaining module is configured to obtain creation information corresponding to each creation element according to the 3D creation is specifically:

the obtaining module is configured to display the 3D creation in a 3D space by an augmented reality (AR) approach; and locate the creation element of the 3D creation, and determine the creation information corresponding to the each creation element according to information displayed in the 3D space.

Optionally, in another possible implementation manner of the fourth aspect, the obtaining module is further configured to transmit a creation modification request to a first terminal corresponding to the first creator, after the processing module determines the first creator corresponding to the each creation element according to the creation information corresponding to the each creation element, the creation modification request including a creation element identifier, a modification scheme and a second creator identifier, and receive a creation modification response returned by the first terminal according to the creation modification request, the creation modification response including approval of modification or disapproval of modification; and correspondingly, the processing module is further configured to modify the creation element corresponding to the creation element identifier according to the modification scheme when the creation modification response is the approval of modification.

The fifth aspect of the present application provides an apparatus for multi-user collaborative creation, where the apparatus is applied to a first terminal, the apparatus including: an obtaining module, a processing module and a transceiving module;

the obtaining module is configured to obtain a gesture action of a first creator in a 3D space;

the processing module is configured to determine at least one creation element according to the gesture action, the creation element including a point, a line and a plane; and generate a 3D creation according to all the creation element; and the transceiving module is configured to upload the 3D creation to a server.

Optionally, in a possible implementation manner of the fifth aspect, the obtaining module is further configured to obtain creation information corresponding to each creation element before the processing module generates the 3D creation according to all the creation element, the creation information including a first creator identifier;

the processing module is further configured to associate the creation information corresponding to the each creation element with the creation element to obtain each associated creation element, and generate the 3D creation according to all the associated creation element.

Optionally, in another possible implementation manner of the fifth aspect, the processing module is further configured to display the 3D creation in the 3D space by an augmented reality (AR) approach before the transceiving module uploads the 3D creation to the server.

Optionally, in another possible implementation manner of the fifth aspect, the transceiving module is further configured to receive a creation modification request transmitted by a second terminal after the 3D creation is uploaded to the server, the creation modification request including a creation element identifier, a modification scheme and a second creator identifier;

correspondingly, the processing module is further configured to determine whether the modification scheme is appropriate according to the creation element identifier and the second creator identifier, to obtain a determined result;

the transceiving module is further configured to feed a creation modification response back to the second terminal according to the determined result, the creation modification response including approval of modification or disapproval of modification.

The sixth aspect of the present application provides an apparatus for multi-user collaborative creation, where the apparatus is applied to a server, the apparatus including: a transceiving module and a processing module;

the transceiving module is configured to receive a creation obtaining request transmitted by a second terminal, the creation obtaining request including a 3D creation identifier and a second creator identifier;

the processing module is configured to determine whether the 3D creation identifier has an association relationship with the second creator identifier;

the obtaining module is further configured to transmit a 3D creation corresponding to the 3D creation identifier to the second terminal when the 3D creation identifier has the association relationship with the second creator identifier.

Optionally, in a possible implementation manner of the sixth aspect, the transceiving module is further configured to receive the 3D creation uploaded by a first terminal before receiving the creation obtaining request transmitted by the second terminal;

the processing module is further configured to obtain all creator identifiers which each have an association relationship with the 3D creation identifier, and store the association relationship between the 3D creation identifier and each creator identifier.

The seventh aspect of the present application provides an apparatus for multi-user collaborative creation, including a processor, a memory, and a computer program stored on the memory and executable on the processor, where when executing the program, the processor implements the method according to any one of the first aspect and the implementation manners of the first aspect, or the method according to any one of the second aspect and the implementation manners of the second aspect, or the method according to any one of the third aspect and the implementation manners of the third aspect.

The eighth aspect of the present application provides a storage medium, where the storage medium stores instructions that, when run on a computer, cause the computer to perform the method according to any one of the first aspect and the implementation manners of the first aspect, or the method according to any one of the second aspect and the implementation manners of the second aspect, or the method according to any one of the third aspect and the implementation manners of the third aspect.

In the method and apparatus for multi-user collaborative creation, and the storage medium provided by the embodiments of the present application, a 3D creation created by a first creator is obtained by a second terminal, the 3D creation including at least one creation element, then creation information corresponding to each creation element is obtained according to the 3D creation, the creation information including a first creator identifier; then the first creator corresponding to each creation element is determined according to the creation information corresponding to the each creation element. In the technical solution, the second terminal may conveniently and quickly determine the first creator corresponding to each creation element in the 3D creation, which simplifies the communication process for the creation and improves the creation efficiency.

DESCRIPTION OF EMBODIMENTS

In order to make the objective, technical solution and advantages of the embodiments of the present application more clear, the technical solutions in the embodiments of the present application are clearly and completely described in the following with reference to the accompanying drawings in the embodiments of the present application. It is apparent that the described embodiments are part rather than all of the embodiments of the present application. All other embodiments obtained by a person of ordinary skill in the art based on the embodiments of the present application without resorting to inventive efforts fall in the scope of the present application.

Figure 1:
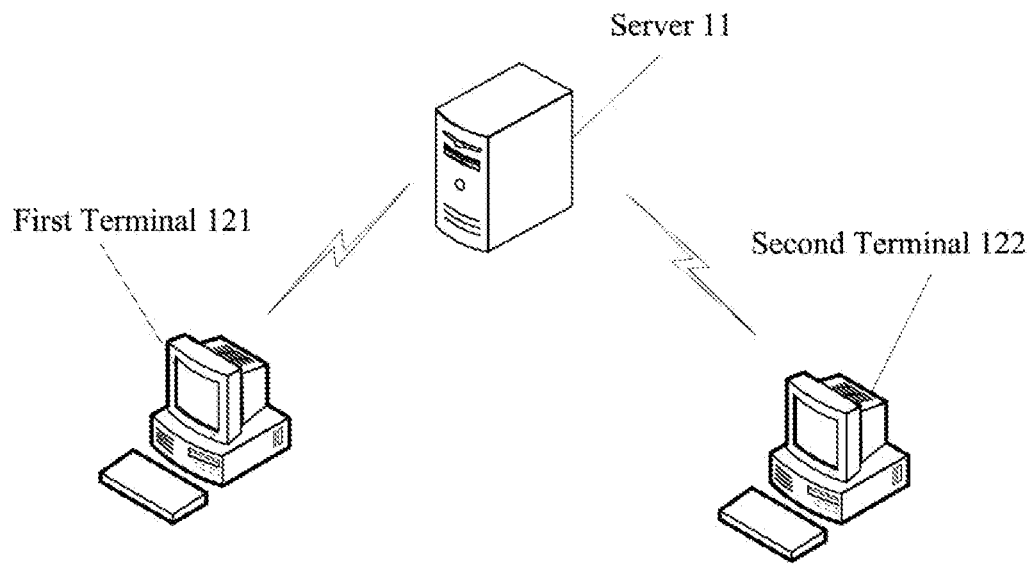
FIG. 1 is a schematic structural diagram of a system for multi-user collaborative creation according to an embodiment of the present application.

The method for multi-user collaborative creation provided by the embodiment of the present application is applied to a system for multi-user collaborative creation. FIG. 1 is a schematic structural diagram of a system for multi-user collaborative creation according to an embodiment of the present application. As shown in FIG. 1, the system for multi-user collaborative creation includes a server 11 and a plurality of terminals 121 and 122 in communication with the server 11. Optionally, the server 11 may be used to store 3D creations completed by multiple creators, and each creator may use one terminal, that is, a first creator may complete his own creation task using a first terminal, and upload it to the server, so that other creators can download from the server the 3D creation to be perfected, and then continue to edit the same.

Optionally, in this embodiment, the embodiment shown in FIG. 1 is described by taking the system for multi-user collaborative creation as an example, the system for multi-user collaborative creation including the server 11, the first terminal 121, and the second terminal 122. In actual application, the embodiment of the present application does not limit the specific number of terminals, which may be implemented according to specific arrangement of labor for each 3D creation, and details are not described herein.

Optionally, the first terminal 121 determines a creation element according to a gesture action of the first creator, generates a 3D creation, and uploads the 3D creation to the server 11. The second terminal 122 transmits a creation obtaining request to the server 11. When the server 11 determines that the second creator corresponding to the second terminal 122 has an association relationship with the 3D creation, the server transmits the 3D creation to the second terminal 122, so that the second creator corresponding to the second terminal 122 further edits or performs other operations on the obtained 3D creation.

Faced with a complicated communication process and a low creation efficiency in the prior art multi-user collaborative creation scheme where the creation works can only be delivered offline and one creator cannot determine the creation content of other creators in time, the embodiment of the present application proposes a method and apparatus for multi-user collaborative creation, and a storage medium, where the 3D creation is obtained, thereby the creation information corresponding to each creation element is obtained, and then the creator corresponding to each creation element is determined, which simplifies the creation modification process and improves the creation efficiency.

The technical solution of the present application will be described in detail below by using a system for multi-user collaborative creation shown in FIG. 1. It should be noted that the following specific embodiments may be combined with each other, and the same or similar concepts or processes may not be described in some embodiments. Embodiments of the present application will be described below with reference to the accompanying drawings.

Figure 2:
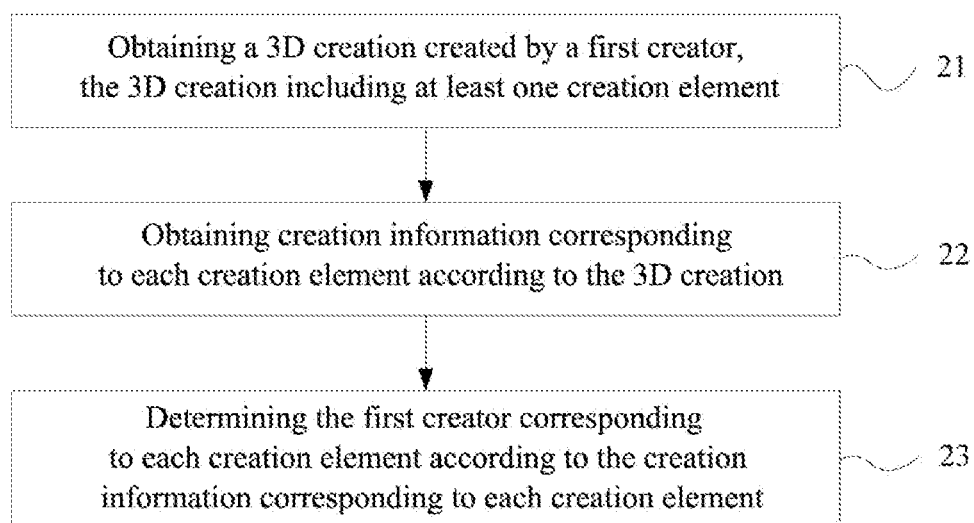
FIG. 2 is a flowchart of Embodiment 1 of a method for multi-user collaborative creation according to an embodiment of the present application.

FIG. 2 is a flowchart of Embodiment 1 of a method for multi-user collaborative creation according to an embodiment of the present application. Optionally, the method for multi-user collaborative creation of the embodiment is applied to the second terminal for description. As shown in FIG. 2, the method for multi-user collaborative creation provided by the embodiment of the present application may include the following steps:

Step 21: obtaining a 3D creation created by a first creator, the 3D creation including: at least one creation element.

Optionally, in the embodiment of the present application, when the second creator corresponding to the second terminal needs to perform an operation on the 3D creation of collaboration, the second creator firstly obtains a 3D creation created by the first creator (where the 3D creation is actually a 3D creation to be perfected). Optionally, the 3D creation may include at least one creation element created by the first creator.

Optionally, as an example, the step 21 may be specifically implemented as follows:

Step A1: transmitting a creation obtaining request to the server, the creation obtaining request including: a 3D creation identifier and a second creator identifier.

Step A2: receiving the above 3D creation transmitted by the server according to the 3D creation identifier and the second creator identifier.

Optionally, in this embodiment, the first terminal and the second terminal may be connected to the server, and may perform wireless communication with the server. Thus, the second creator corresponding to the second terminal may transmit a creation obtaining request to the server to obtain the 3D creation created by the first creator corresponding to the first terminal and stored in the server.

Optionally, the server can store a plurality of 3D creations, and each 3D creation corresponds to a plurality of creators. Therefore, the creation obtaining request transmitted by the second terminal to the server must include a 3D creation identifier and a second creator identifier, so that the server can determine, according to the 3D creation identifier, the 3D creation requested by the second terminal, and determine, according to the second creator identifier, whether the second creator is a creator of the 3D creation. Optionally, when determining that the second creator has an association relationship with the 3D creation, the server transmits the 3D creation to the second terminal. Correspondingly, the second terminal receives the above 3D creation transmitted by the server according to the 3D creation identifier and the second creator identifier.

Step 22: obtaining creation information corresponding to each creation element according to the 3D creation.

The creation information includes: a first creator identifier.

Optionally, in the embodiment of the present application, each creation element in the 3D creation uploaded to the server has an association relationship with the corresponding creation information. Therefore, after obtaining the 3D creation, the second terminal can obtain the creation information corresponding to each creation element.

Optionally, the creation information includes, but is not limited to, the first creator identifier, which may also include other information, such as a creation time, etc. The specific content of the creation information may be determined according to actual conditions, which will not be described in detail herein.

Optionally, as an example, the step 22 may be specifically implemented as follows:

Step B1: displaying the 3D creation in a 3D space by an augmented reality (AR) approach.

Step B2: locating the creation element(s) of the 3D creation, and determining the creation information corresponding to each creation element according to information displayed in the 3D space.

Optionally, in the embodiment of the present application, in order to enable the second creator corresponding to the second terminal to easily obtain the creation information corresponding to each creation element, after obtaining the 3D creation, the second terminal may firstly display the 3D creation in the 3D space by the augmented reality (AR) approach.

Optionally, AR technology is a new technology that integrates "real world" information with virtual world information "seamlessly". It is to simulate, through computer and other scientific technologies, physical information (visual information, sound, taste, touch, etc.) that is difficult to experience in a certain time and space of the real world, then superimpose the physical information, thus applying virtual information to the real world and making it perceivable by human senses to achieve a sensory experience that transcends reality. Therefore, when the above 3D creation is displayed in the 3D space by the augmented reality (AR) approach, the second creator corresponding to the second terminal may perform mouse picking or click a creation element to display creation information corresponding to the creation element in the 3D space. Therefore, when the second terminal determines the creation information corresponding to each creation element according to the information displayed in the 3D space, the second creator corresponding to the second terminal may also obtain the creation information corresponding to each creation element.

Step 23: determining the first creator corresponding to each creation element according to the creation information corresponding to each creation element.

Optionally, in the embodiment of the present application, the creation information corresponding to each creation element may include a creator identifier (and creation time), so that the second terminal may determine the first creator corresponding to each creation element according to the creation information corresponding to each creation element obtained above. That is, if the second terminal is to perform an operation such as, modifying a certain creation element, the second terminal may conveniently obtain the first creator of the creation element. And before modifying the elements in the 3D creation information, communication with the first creator can be done in time, which improves the experience and efficiency of the multi-user creation.

In the method for multi-user collaborative creation provided by the embodiment of the present application, a 3D creation created by the first creator is obtained by the second terminal, the 3D creation including: at least one creation element; then creation information corresponding to each creation element is obtained according to the 3D creation, the creation information including a first creator identifier; then the first creator corresponding to each creation element is determined according to the creation information corresponding to the each creation element. In the technical solution, the second terminal may conveniently and quickly determine the first creator corresponding to each creation element in the 3D creation, which simplifies the communication process for the creation and improves the creation efficiency.

Figure 3:
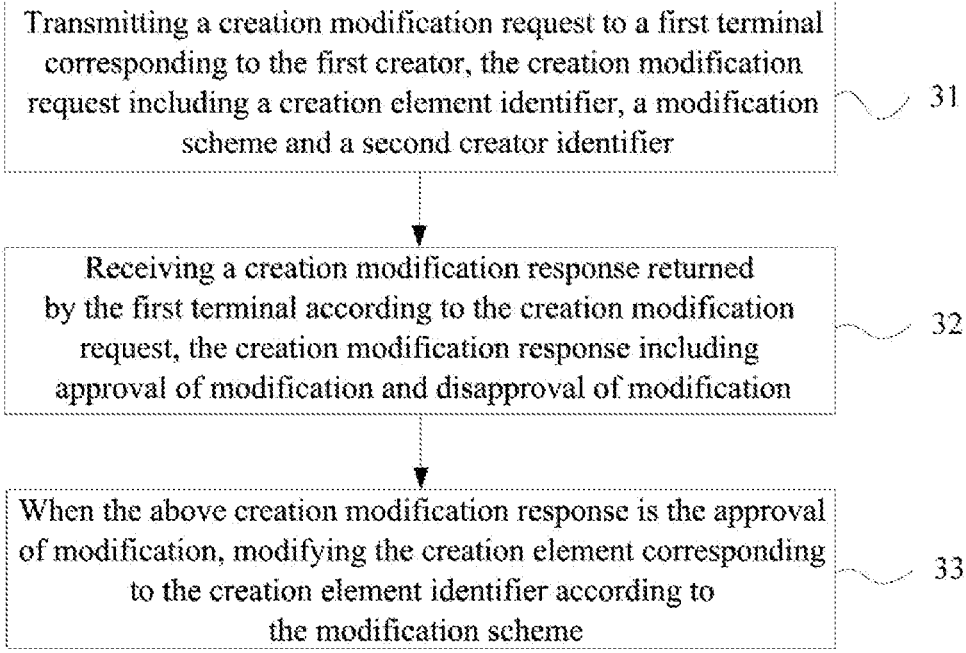
FIG. 3 is a flowchart of Embodiment 2 of a method for multi-user collaborative creation according to an embodiment of the present application.

Optionally, on the basis of the foregoing embodiment, FIG. 3 is a schematic flowchart of Embodiment 2 of the method for multi-user collaborative creation provided by the embodiment of the present application. As shown in FIG. 3, after the step 23 (determining the first creator corresponding to each creation element according to the creation information corresponding to each creation element), the method for multi-user collaborative creation provided by the embodiment of the present application may include the following steps:

Step 31: transmitting a creation modification request to a first terminal corresponding to the first creator, the creation modification request including: a creation element identifier, a modification scheme, and the second creator identifier.

Optionally, when the second creator corresponding to the second terminal is to modify a certain creation element in the 3D creation, the second creator may firstly transmit, by using the second terminal, the creation modification request including the creation element identifier, the modification scheme and the second creator identifier, so as to enable the first terminal to determine the creation element to be modified according to the creation element identifier, and determines whether the modification scheme corresponding to the creation element is appropriate according to the second creator identifier, and generate a creation modification response.

Step 32: receiving a creation modification response returned by the first terminal according to the creation modification request, the creation modification response including: approval of modification or disapproval of modification.

Optionally, after determining whether the modification scheme is appropriate according to the creation element identifier and the second creator identifier, the first terminal generates a creation modification response, and returns the same to the second terminal. Correspondingly, the second terminal receives the creation modification response.

Optionally, when the first terminal determines that the modification scheme corresponding to the creation element identifier is appropriate, the generated creation modification response may be approval of modification; and when the first terminal determines that the modification scheme corresponding to the creation element identifier is inappropriate, the generated creation modification response can be disapproval of modification.

Step 33: when the above creation modification response is the approval of modification, modifying the creation element corresponding to the creation element identifier according to the modification scheme.

Optionally, when receiving the creation modification response transmitted by the first terminal which includes the approval of modification, the second terminal may perform corresponding modification on the creation element corresponding to the creation element identifier based on the above modification scheme.

Optionally, after modifying the creation element corresponding to the creation element identifier, the second terminal may associate the modified creation element with the second creator identifier corresponding to the second terminal, to enable other creators to directly obtain the second creator identifier corresponding to the modified creation element when obtaining the 3D creation. Correspondingly, the modified creation element can also be associated with the modification time, so as to enable the other creators, when obtaining the 3D creation, to directly get knowledge of which creator modified the creation element at what time.

In the method for multi-user collaborative creation provided by the embodiment of the present application, the second terminal transmits a creation modification request including a creation element identifier, a modification scheme and a second creator identifier to the first terminal corresponding to the determined first creator, receives a creation modification response returned by the first terminal according to the creation modification request, and modifies the creation element corresponding to the creation element identifier according to the modification scheme when the creation modification response is the approval of modification. The technical solution ensures the validity of the modification of 3D creation by information interaction between the second terminal and the first terminal, and improves the satisfaction of each creator.

Figure 4:
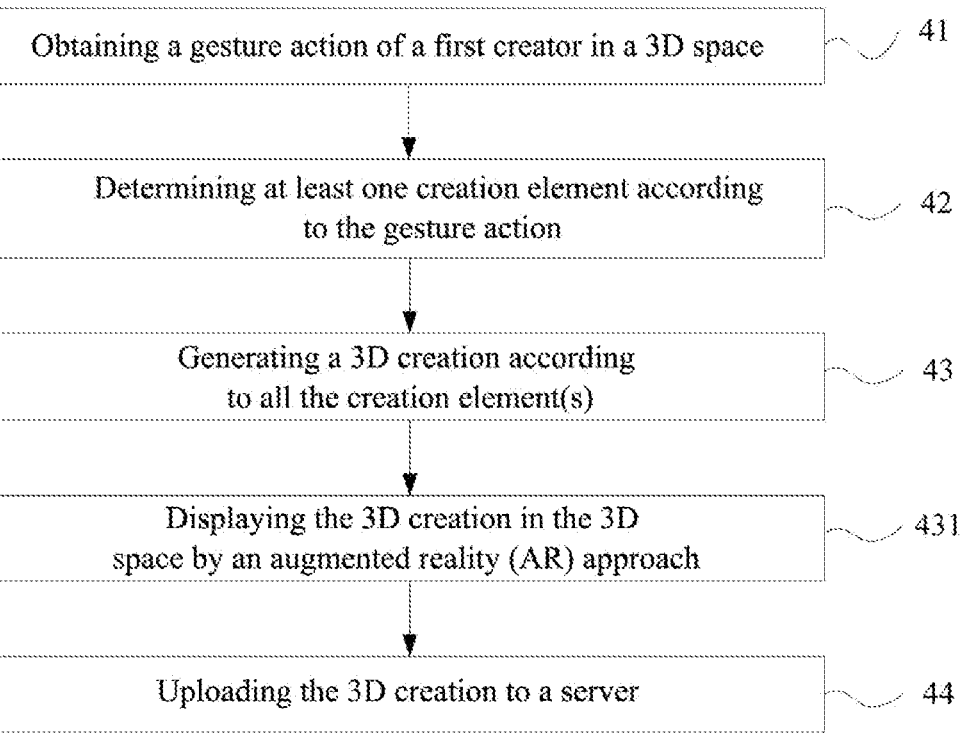
FIG. 4 is a flowchart of Embodiment 3 of a method for multi-user collaborative creation according to an embodiment of the present application.

Optionally, FIG. 4 is a flowchart of Embodiment 3 of a method for multi-user collaborative creation according to an embodiment of the present application. Optionally, the method for multi-user collaborative creation of the embodiment is applied to the first terminal for description. As shown in FIG. 4, the method for multi-user collaborative creation provided by the embodiment of the present application may include the following steps:

Step 41: obtaining a gesture action of a first creator in a 3D space.

Optionally, in the embodiment of the present application, the first terminal may obtain the gesture action of the first creator in the 3D space by using a camera. That is, when the first creator creates the 3D space, the camera function of the first terminal is turned on, and the gesture action of the first creator can be captured.

Step 42: determining at least one creation element according to the gesture action.

The creation element includes: a point, a line and a plane.

Optionally, when the first terminal obtains the gesture action of the first creator in the 3D space, the first terminal determines the at least one creation element created by the first creator by analyzing a start point, an end point, and a direction from the start point to the end point of the gesture action.

For example, if the start point and the end point of the gesture action are the same point, and there is no other element before the start point and the end point, then the creation element corresponding to the gesture action is a point. If the start point and the end point of the gesture action are the same point, but the start point and the end point form a circle or a polygon (for example, a square, a rectangle, a hexagon, etc.), then the creation element corresponding to the gesture action may be a plane. If the start point and the end point of the gesture action are two different points, and there is a line between the start point and the end point, then the creation element corresponding to the gesture action can be considered as a line. Optionally, the line can be a straight line, a curve or an arc, which is not limited in the embodiment of the present application.

Step 43: generating a 3D creation according to all the creation element(s).

Optionally, in this embodiment, after the first terminal determines all the creation element(s) according to the gesture action of the first creator, the first terminal may integrate all the creation element(s) according to the location of each creation element, thereby obtaining the above 3D creation.

Step 44: uploading the 3D creation to a server.

In this embodiment, after the first terminal generates the 3D creation, in order to facilitate other creators to continue to improve the 3D creation, the first terminal may upload the same to the server, so that other creators can obtain the 3D creation from the server through the corresponding terminal.

Optionally, in the embodiment of the present application, the server may be an AR cloud server, and the AR cloud server may be a real-time interaction interface for the virtual and real worlds. The AR cloud server may display the 3D creation on the real-time interactive interface according to a setting of the first creator.

Optionally, as an example, before the step 44, the method for multi-user collaborative creation provided in this embodiment may further include the following step 431:

Step 431: displaying the 3D creation in the 3D space by an augmented reality (AR) approach.

Optionally, after generating the 3D creation according to all the determined creation element(s), the first terminal may firstly display the 3D creation to the first creator. Optionally, the manner of displaying may be displaying the 3D creation in a 3D space formed by a user interaction interface of the first terminal through the augmented reality (AR) approach, so that the first creator can clearly preview the 3D creation, and then determine whether the 3D creation needs to be modified and perfected according to the satisfaction with the 3D creation.

In the method for multi-user collaborative creation provided by the embodiment of the present application, the first terminal obtains a gesture action of the first creator in a 3D space, determines at least one creation element according to the gesture action, generates a 3D creation according to all the creation element(s), and uploads the 3D creation to the server. In the technical solution, the first terminal generates a 3D creation according to the gesture action of the first creator and uploads the 3D creation to the server, thus facilitating all the creators corresponding to the 3D creation to obtain the 3D creation, simplifying the delivering process of the 3D creation, and improving the creation efficiency.

Figure 5:
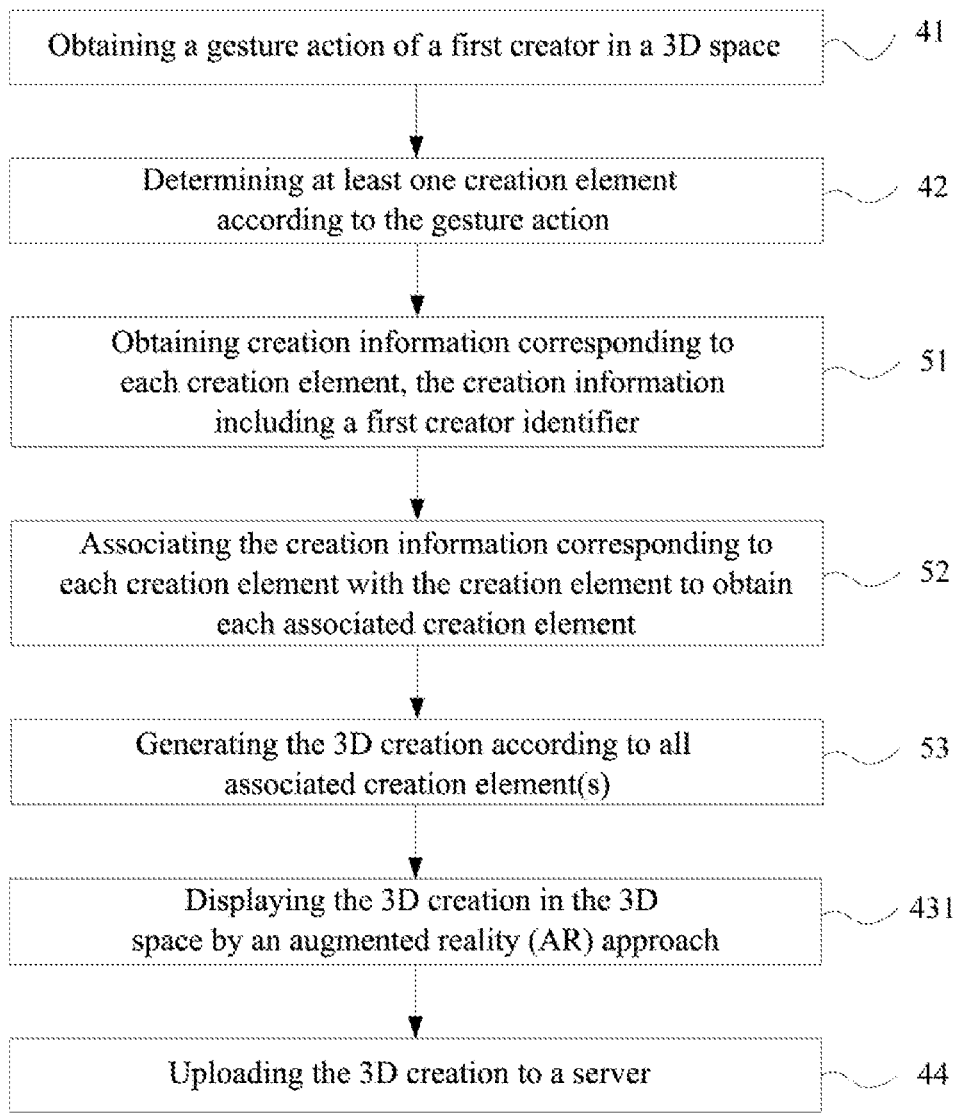
FIG. 5 is a flowchart of Embodiment 4 of a method for multi-user collaborative creation according to an embodiment of the present application.

Optionally, on the basis of the foregoing embodiment, FIG. 5 is a schematic flowchart of Embodiment 4 of the method for multi-user collaborative creation provided by the embodiment of the present application. As shown in FIG. 5, before the step 43 (generating a 3D creation according to all the creation element(s)), the method for multi-user collaborative creation may further include the following steps:

Step 51: obtaining creation information corresponding to each creation element, the creation information including a first creator identifier.

Optionally, in the embodiment of the present application, when the first terminal determines each creation element according to the gesture action of the first creator, the first terminal may also correspondingly obtain the creation information corresponding to the creation element. Optionally, the creation information may include a creation time of the creation element and a first creator identifier corresponding to the creation element.

It is worth noting that, during the entire creating process of the 3D creation, subsequent creators may modify a certain creation element of the former creator according to actual needs, therefore in the case where each creator creates a partial 3D creation of his own task, the creator's corresponding terminal may determine the creation time and creator identifier of each creation element when determining each creation element, which provide a basis for subsequent creators to determine the creation information corresponding to a certain creation element.

Step 52: associating the creation information corresponding to each creation element with the creation element to obtain each associated creation element.

Optionally, when the first terminal determines each creation element and the creation information corresponding to each creation element, in order to upload the creation information corresponding to each creation element to the server, the first terminal may associate the creation information corresponding to each creation element with the creation element, that is, bind the creation information with the corresponding creation element, thus each associated creation element may be obtained.

Correspondingly, the above step 43 (generating a 3D creation according to all the creation element(s)) may be replaced with the following steps:

Step 53: generating the 3D creation according to all associated creation element(s).

Optionally, in the present embodiment, after obtaining each associated creation element according to each creation element and the creation information corresponding to each creation element, the first terminal may integrate all the associated creation element(s) according to the location of each associated creation element so as to obtain the above 3D creation.

In the method for multi-user collaborative creation provided by the embodiment of the present application, the first terminal can obtain the creation information corresponding to each creation element when determining each creation element, associate the creation information corresponding to each creation element with the creation element to obtain each associated creation element, and generate the 3D creation according to all associated creation element(s). In the technical solution, each creation element in the generated 3D creation is associated with corresponding creation information, which provides the possibility for subsequent creators to determine the creation information for each creation element.

Figure 6:
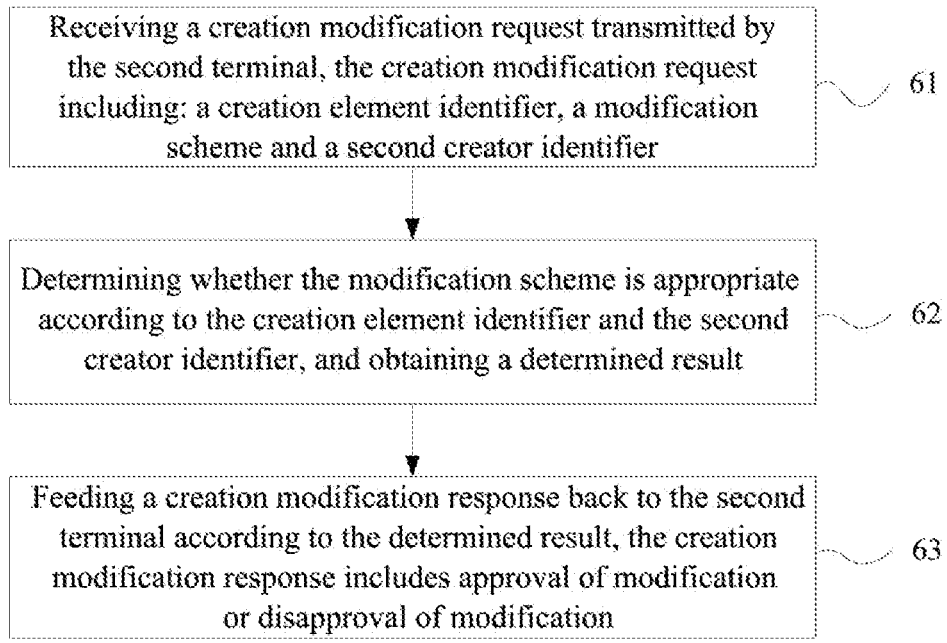
FIG. 6 is a flowchart of Embodiment 5 of a method for multi-user collaborative creation according to an embodiment of the present application.

Optionally, on the basis of the foregoing embodiment, FIG. 6 is a schematic flowchart of Embodiment 5 of the method for multi-user collaborative creation provided by the embodiment of the present application. As shown in FIG. 6, after the step 44 (uploading the 3D creation to the server), the method for multi-user collaborative creation may further include the following steps:

Step 61: receiving a creation modification request transmitted by a second terminal, the creation modification request including: a creation element identifier, a modification scheme, and a second creator identifier.

Optionally, each creation element in the 3D creation generated by the first terminal corresponds to the corresponding creation information, therefore, after obtaining the 3D creation uploaded by the first terminal to the server, the second terminal may obtain the creation information corresponding to each creation element, and determine the first creator corresponding to each creation element according to the creation information corresponding to each creation element. Therefore, when the second terminal needs to modify a certain creation element in the 3D creation, the second terminal may firstly transmit the creation modification request to the first terminal. In order to enable the first terminal to determine the second creator corresponding to the second terminal, the creation element to be modified by the second creator, and the specific modification scheme, the creation modification request transmitted by the second terminal and received by the first terminal needs to include a creation element identifier, a modification scheme, and a second creator identifier.

Step 62: determining whether the modification scheme is appropriate according to the creation element identifier and the second creator identifier, and obtaining a determined result.

Optionally, when receiving the creation modification request transmitted by the second terminal, the first terminal obtains the second creation identifier corresponding to the second terminal, the creation element identifier corresponding to the creation element requested to be modified, and the modification scheme of the creation element, by analyzing the creation modification request. Thus, in an embodiment of the present application, the first terminal determines that the second creator is one of the creators of the 3D creation, further determines the corresponding creation element according to the creation element identifier, and finally determines whether the modification scheme corresponding to the creation element identifier is appropriate, thus obtaining the determined result.

Step 63: feeding a creation modification response back to the second terminal according to the determined result, the creation modification response includes approval of modification or disapproval of modification.

Optionally, after the first terminal determines whether the modification scheme is appropriate according to the creation element identifier, the first terminal may generate a creation modification response according to the determined result. Optionally, when the determined result is appropriate, the generated creation modification response may be approval of modification; and when the determined result is inappropriate, the generated creation modification response may be disapproval of modification.

In the method for multi-user collaborative creation provided by the embodiment of the present application, the first terminal receives a creation modification request which is transmitted by the second terminal and includes a creation element identifier, a modification scheme and a second creator identifier, determines whether the modification scheme is appropriate according to the creation element identifier and the second creator identifier to obtain a determined result, feeds the creation modification response back to the second terminal according to the foregoing determined result, so that the second terminal determines, according to the creation modification response, whether the creation element corresponding to the creation element identifier may be modified, which simplifies the communication scheme between creators and improves the modification accuracy of 3D creation, and thus improves the creation efficiency of multi-user collaboration.

Figure 7:
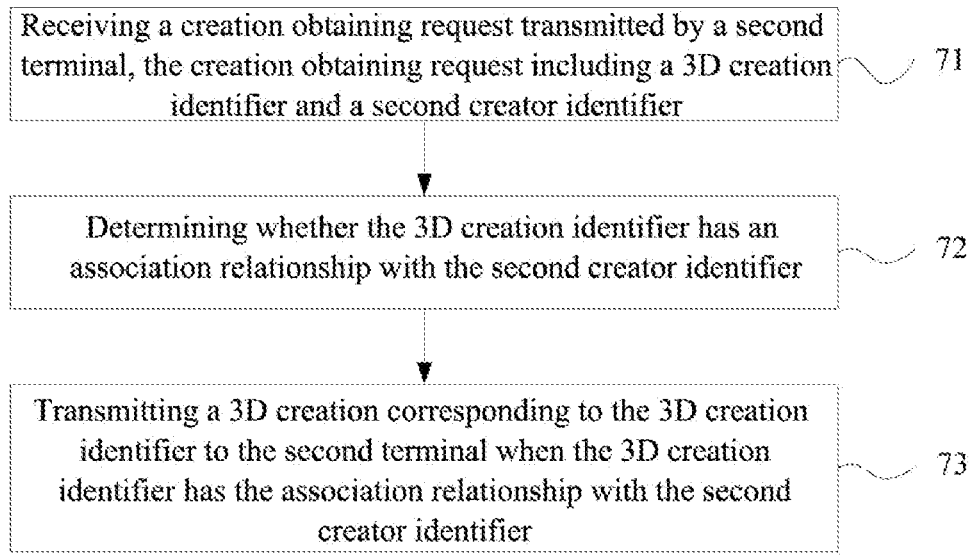
FIG. 7 is a flowchart of Embodiment 6 of a method for multi-user collaborative creation according to an embodiment of the present application.

Optionally, FIG. 7 is a flowchart of Embodiment 6 of a method for multi-user collaborative creation according to an embodiment of the present application. Optionally, the method for multi-user collaborative creation of the embodiment is applied to the server for description. As shown in FIG. 7, the method for multi-user collaborative creation provided by the embodiment of the present application may include the following steps:

Step 71: receiving a creation obtaining request transmitted by the second terminal, the creation obtaining request including: a 3D creation identifier and a second creator identifier.

Optionally, in the embodiment of the present application, the server stores a 3D creation uploaded by a first creator of the 3D creation through a first terminal, thus, when the other creators of the 3D creation are to continue to perfect or modify the 3D creation, a creation obtaining request can be transmitted to the server to obtain the corresponding 3D creation.

Optionally, the server may store a plurality of 3D creations, and each 3D creation may correspond to a plurality of creators. Therefore, the creation obtaining request transmitted by the second terminal to the server must include a 3D creation identifier and a second creator identifier. In this way, the server can determine the 3D creation requested by the second terminal from the plurality of 3D creations according to the 3D creation identifier, and determine whether the second creator has an obtaining authority according to the second creator identifier.

Step 72: determining whether the 3D creation identifier has an association relationship with the second creator identifier.

Optionally, when storing each 3D creation, the server also stores an association relationship between the 3D creation identifier and all the relevant creator identifiers. Therefore, after obtaining the creation obtaining request, the server determines, according to the 3D creation identifier and the second creator identifier in the creation obtaining request, whether the 3D creation identifier has an association relationship with the second creator identifier, so as to determine whether the second creator corresponding to the second terminal requesting to obtain the 3D creation has an authority to obtain the 3D creation.

Step 73: transmitting a 3D creation corresponding to the 3D creation identifier to the second terminal when the 3D creation identifier has the association relationship with the second creator identifier.

As an example, the case that the 3D creation identifier has an association relationship with the second creator identifier indicates that the 3D creation can be modified or edited by the second creator. Therefore, the server may transmit the 3D creation corresponding to the 3D creation identifier to the second terminal according to the identifier of the second creator.

As another example, if the 3D creation identifier does not have any association relationship with the second creator identifier, the server may reject the creation obtaining request. Optionally, a creation obtaining response that the second creator does not have the obtaining authority may be fed back to the second terminal, so as to inform the second creator of the reason why the second terminal does not obtain the 3D creation.

In the method for collaborative creation provided by the embodiment of the present application, the server receives a creation obtaining request that is transmitted by a second terminal and includes a 3D creation identifier and a second creator identifier, transmits a 3D creation corresponding to the 3D creation identifier to the second terminal when it is determined that the 3D creation identifier has an association relationship with the second creator identifier. In the technical solution, the server only allows the creator having an association relationship with the 3D creation to obtain the 3D creation, thereby ensuring the safety of the 3D creation and the improving user experience.

Figure 8:
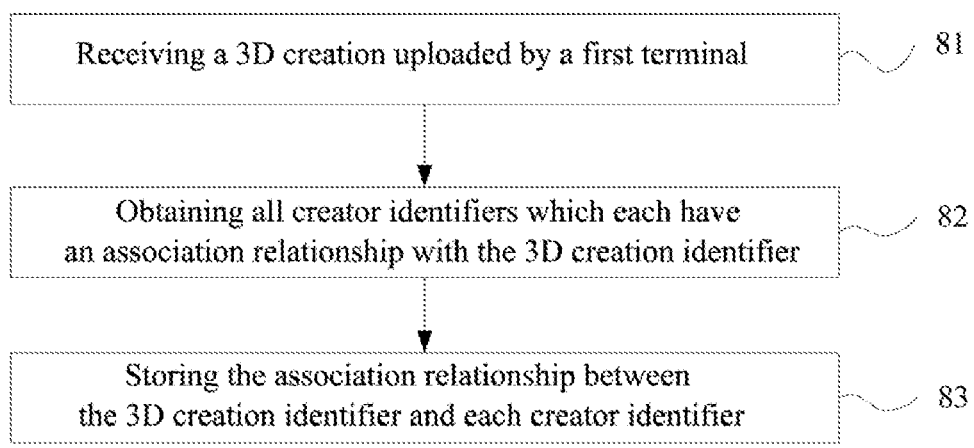
FIG. 8 is a flowchart of Embodiment 7 of a method for multi-user collaborative creation according to an embodiment of the present application.

Optionally, on the basis of the foregoing embodiment, FIG. 8 is a schematic flowchart of Embodiment 7 of the method for multi-user collaborative creation provided by the embodiment of the present application. As shown in FIG. 8, before the step 71 (receiving a creation obtaining request transmitted by a second terminal), the method for multi-user collaborative creation may further include the following steps:

Step 81: receiving a 3D creation uploaded by a first terminal.

Optionally, in the embodiment of the present application, a first terminal uploads a 3D creation to the server after generating the 3D creation, and correspondingly, the server may obtain the 3D creation.

Optionally, each creation element of the 3D creation may be a creation element associated with the creation information, so that other creators of the 3D creation can obtain the first creator corresponding to each creation element when obtaining the 3D creation.

Step 82: obtaining all creator identifiers which each have an association relationship with the 3D creation identifier.

Optionally, in this embodiment, since the 3D creation needs to be completed by a plurality of people with the server as a delivery platform, in order to avoid the 3D creation being obtained and tampered with by other unrelated creators, when receiving the 3D creation uploaded by the first terminal, the server may obtain all the creator identifiers having an association relationship with the 3D creation identifier and store them in the server.

Step 83: storing the association relationship between the 3D creation identifier and each creator identifier.

Optionally, after obtaining all the creator identifiers having an association relationship with the 3D creation identifier, the server, in addition to storing all the creator identifiers to the server, may store the association relationship between the 3D creation identifier and each creator identifier, so that when the terminal transmits the creation obtaining request to the server, the terminal can determine whether the creator identifier in the creation obtaining request has an association relationship with the 3D creation identifier, and further determine whether the creator corresponding to the creator identifier has the obtaining authority.

In the method for multi-user collaborative creation provided by the embodiment of the present application, before receiving the creation obtaining request transmitted by the second terminal, the server firstly receives the 3D creation uploaded by the first terminal, obtains all the creator identifiers which each have an association relationship with the 3D creation identifier, and stores the association relationship between the 3D creation identifier and each creator identifier, so that the server can determine the creator identifier in the creation obtaining request when receiving the creation obtaining request, and authenticate the creator corresponding to the creator identifier.

Optionally, on the basis of any of the foregoing embodiments, a brief description of the interaction among the first terminal, the second terminal and the server will be made with the following embodiment, in combination with all the foregoing embodiments.

Figure 9:
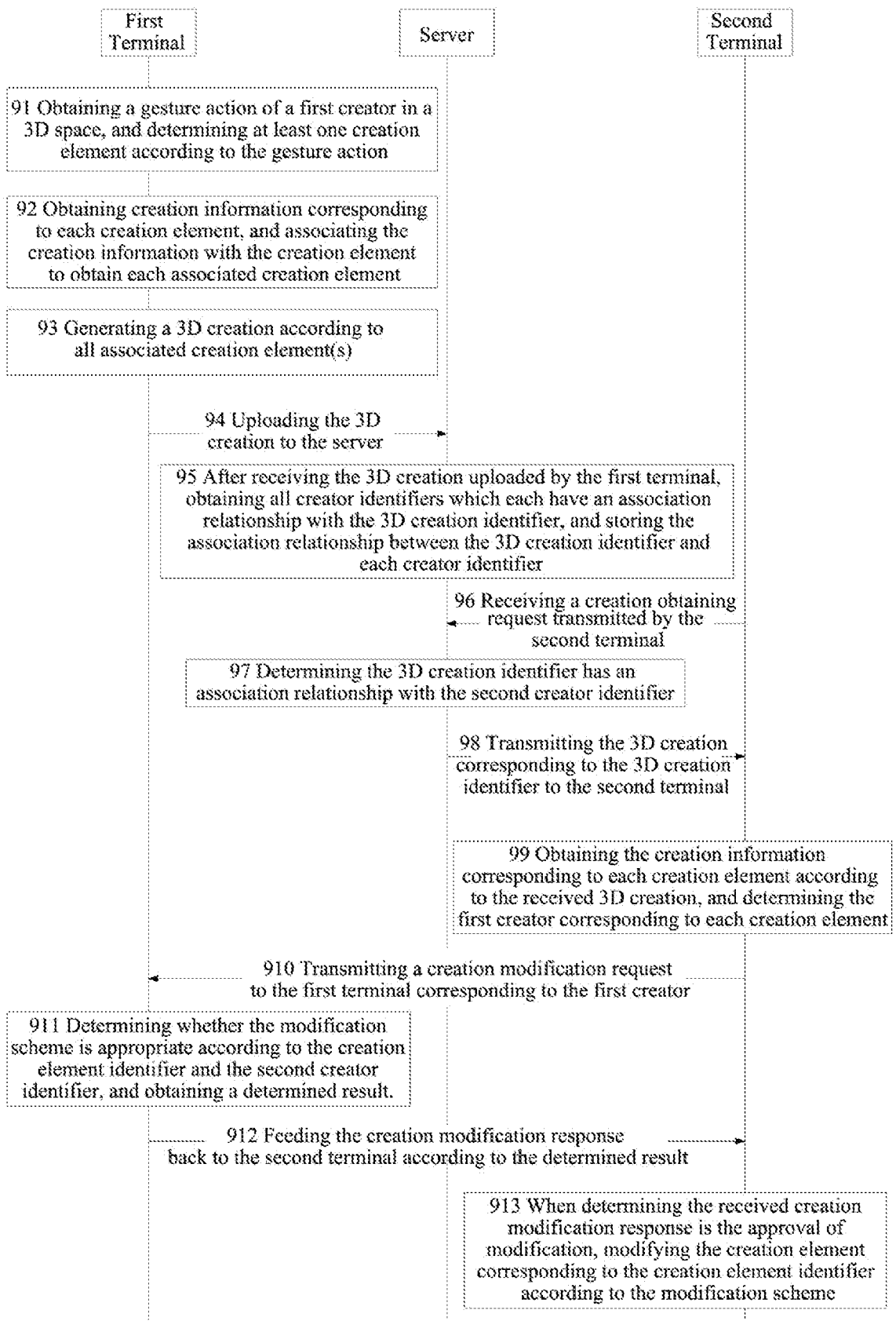
FIG. 9 is a schematic diagram of interaction of an embodiment of method for multi-user collaborative creation according to an embodiment of the present application.

FIG. 9 is a schematic diagram of interaction of an embodiment of method for multi-user collaborative creation according to an embodiment of the present application. As shown in FIG. 9, the method for multi-user collaborative creation may include the following steps:

Step 91: the first terminal obtains a gesture action of a first creator in a 3D space, and determines at least one creation element according to the gesture action.

Step 92: the first terminal obtains creation information corresponding to each creation element, and associates the creation information with the creation element to obtain each associated creation element.

The creation information includes: a first creator identifier.

Step 93: the first terminal generates a 3D creation according to all associated creation element(s).

Step 94: the first terminal uploads the 3D creation to the server.

Step 95: after receiving the 3D creation uploaded by the first terminal, the server obtains all creator identifiers which each have an association relationship with the 3D creation identifier, and stores the association relationship between the 3D creation identifier and each creator identifier.

Step 96: the server receives a creation obtaining request transmitted by the second terminal.

The creation obtaining request includes: a 3D creation identifier and a second creator identifier.

Step 97: the server determines the 3D creation identifier has an association relationship with the second creator identifier.

Step 98: the server transmits the 3D creation corresponding to the 3D creation identifier to the second terminal.

Step 99: the second terminal obtains the creation information corresponding to each creation element according to the received 3D creation, and determines the first creator corresponding to each creation element.

Step 910: the second terminal transmits a creation modification request to the first terminal corresponding to the first creator.

The creation modification request includes: a creation element identifier, a modification scheme, and the second creator identifier.

Step 911: the first terminal determines whether the modification scheme is appropriate according to the creation element identifier and the second creator identifier, and obtains a determined result.

Step 912: the first terminal feeds a creation modification response back to the second terminal according to the determined result.

The creation modification response includes: approval of modification or disapproval of modification.

Step 913: when determining the received creation modification response is the approval of modification, the second terminal modifies the creation element corresponding to the creation element identifier according to the modification scheme.

For detailed operations of the steps in this embodiment, reference can be made to the descriptions in the foregoing embodiments, and details are not described herein again.

The following are apparatus embodiments of the present application, which may be used to implement the method embodiments of the present application. For details not disclosed in the apparatus embodiments of the present application, reference can be made to the method embodiments of the present application.

Figure 10:
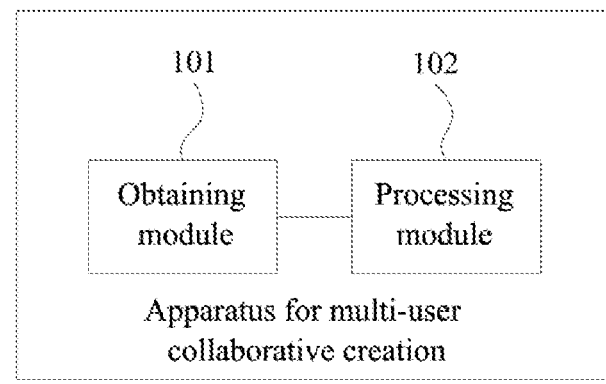
FIG. 10 is a structural schematic diagram of Embodiment 1 of an apparatus for multi-user collaborative creation according to an embodiment of the present application.

FIG. 10 is a structural schematic diagram of Embodiment 1 of an apparatus for multi-user collaborative creation according to an embodiment of the present application. The apparatus for multi-user collaborative creation may be integrated in a second terminal or may be the second terminal. Optionally, as shown in FIG. 10, the apparatus for multi-user collaborative creation is applied to the second terminal, and the apparatus may include: an obtaining module 101 and a processing module 102.

The obtaining module 101 is configured to: obtain a 3D creation created by a first creator, the 3D creation including at least one creation element, then obtain creation information corresponding to each creation element according to the 3D creation, the creation information including a first creator identifier.

The processing module 102 is configured to: determine a first creator corresponding to each creation element according to the creation information corresponding to each creation element.

Optionally, in a possible implementation manner of the embodiment of the present application, that the obtaining module 101 is configured to obtain a 3D creation created by a first creator, is specifically:

the obtaining module 101 is specifically configured to transmit a creation obtaining request to a server, the creation obtaining request including a 3D creation identifier and a second creator identifier; receive the 3D creation transmitted by the server according to the 3D creation identifier and the second creator identifier.

Optionally, in another possible implementation manner of the embodiment of the present application, that the obtaining module 101 is configured to obtain creation information corresponding to each creation element according to the 3D creation is specifically:

the obtaining module 101 is configured to display the 3D creation in a 3D space by an augmented reality (AR) approach, and locate the creation element of the 3D creation, and determine the creation information corresponding to each creation element according to the information displayed in the 3D space.

Optionally, in another possible implementation manner of the embodiment of the present application, the obtaining module 101 is further configured to transmit a creation modification request to the first terminal corresponding to the first creator after the processing module 102 determines the first creator corresponding to each creation element according to the creation information corresponding to each creation element, and receive a creation modification response returned by the first terminal according to the creation modification request.

The creation modification request includes: a creation element identifier, a modification scheme, and a second creator identifier, and the creation modification response includes: approval of modification or disapproval of modification.

Correspondingly, the processing module 102 is further configured to modify the creation element corresponding to the creation element identifier according to the modification scheme when the creation modification response is the approval of modification.

The apparatus provided by the embodiment of the present application can be used to perform the method in the embodiments shown in FIG. 2 and FIG. 3, or can be used to perform the steps performed by the second terminal in the embodiment shown in FIG. 9, and the implementation principle and technical effect of the apparatus are similar to those of the method and steps, thus details are not described herein again.

Figure 11:
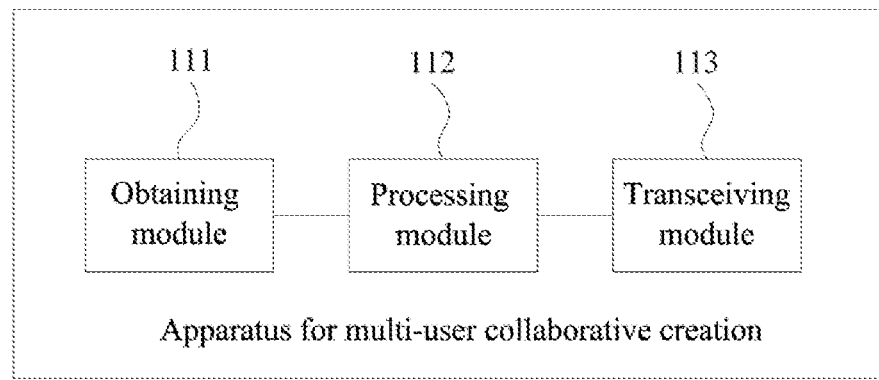
FIG. 11 is a structural schematic diagram of Embodiment 2 of an apparatus for multi-user collaborative creation according to an embodiment of the present application.

FIG. 11 is a structural schematic diagram of Embodiment 2 of an apparatus for multi-user collaborative creation according to an embodiment of the present application. The apparatus for multi-user collaborative creation may be integrated in a first terminal or may be the first terminal. Optionally, as shown in FIG. 11, the apparatus for multi-user collaborative creation is applied to the first terminal, and the apparatus may include: an obtaining module 111, a processing module 112 and a transceiving module 113.

The obtaining module 111 is configured to obtain a gesture action of a first creator in a 3D space.

The processing module 112 is configured to: determine at least one creation element according to the gesture action, the creation element including: a point, a line and a plane, and generate a 3D creation according to all the associated creation element(s).

The transceiving module 113 is configured to upload the 3D creation to a server.

Optionally, in a possible implementation manner of the embodiment of the present application, the obtaining module 111 is further configured to obtain creation information corresponding to each creation element before the processing module 112 generates the 3D creation according to all the associated creation element(s), the creation information including a first creator identifier.

The processing module 112 is further configured to: associate the creation information corresponding to the each creation element with the creation element to obtain each associated creation element, and generate the 3D creation according to all associated creation element(s).

Optionally, in another possible implementation manner of the embodiment of the present application, the processing module 112 is further configured to: display the 3D creation in the 3D space by an augmented reality (AR) approach before the transceiving module 113 uploads the 3D creation to the server.

Optionally, in another possible implementation manner of the embodiment of the present application, the transceiving module 113 is further configured to receive a creation modification request transmitted by a second terminal after the 3D creation is uploaded to the server, the creation modification request including: a creation element identifier, a modification scheme and a second creator identifier.

Correspondingly, the processing module 112 is further configured to determine whether the modification scheme is appropriate according to the creation element identifier and the second creator identifier, to obtain a determined result.

The transceiving module 113 is further configured to feed a creation modification response back to the second terminal according to the determined result, the creation modification response including: approval of modification or disapproval of modification.

The apparatus provided by the embodiment of the present application can be used to perform the method in the embodiments shown in FIG. 4 to FIG. 6, or the steps performed by the first terminal in the embodiment shown in FIG. 9. As the implementation principle and technical effect of the apparatus and those of the method and steps are similar, details are not described herein again.

Figure 12:
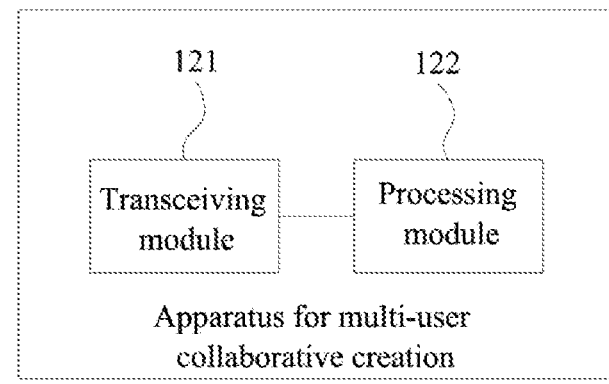
FIG. 12 is a structural schematic diagram of Embodiment 3 of an apparatus for multi-user collaborative creation according to an embodiment of the present application.

FIG. 12 is a structural schematic diagram of Embodiment 3 of an apparatus for multi-user collaborative creation according to an embodiment of the present application. The apparatus for multi-user collaborative creation may be integrated in a server or may be the server. Optionally, as shown in FIG. 12, the apparatus for multi-user collaborative creation is applied to the server, and the apparatus may include: a transceiving module 121 and a processing module 122.

The transceiving module 121 is configured to: receive a creation obtaining request transmitted by a second terminal, the creation obtaining request including: a 3D creation identifier and a second creator identifier.

The processing module 122 is configured to: determine whether the 3D creation identifier has an association relationship with the second creator identifier.

The transceiving module 121 is further configured to transmit a 3D creation corresponding to the 3D creation identifier to the second terminal when the 3D creation identifier has an association relationship with the second creator identifier.

Optionally, in a possible implementation manner of the embodiment of the present application, the transceiving module 121 is further configured to receive the 3D creation uploaded by a first terminal before receiving the creation obtaining request transmitted by the second terminal.

The processing module 122 is further configured to: obtain all creator identifiers which each having an association relationship with the 3D creation identifier, and store the association relationship between the 3D creation identifier and each creator identifier.

The apparatus provided by the embodiment of the present application can be used to perform the method in the embodiments shown in FIG. 7 and FIG. 8, or the steps performed by the server in the embodiment shown in FIG. 9. As the implementation principle and technical effect of the apparatus and those of the method and steps are similar, details are not described herein again.

It should be noted that the division of respective modules of the above apparatus is only a division of a logical function, and all or part of respective modules may be integrated into one physical entity or physically separated in actual implementation. And all of these modules can be implemented by software invoking of processing component; or all of them can be implemented in hardware form; or some modules can be implemented by software invoking of processing component, and some modules are implemented in hardware form. For example, the determining module may be a separately set processing element, or may be integrated on one chip of the above apparatus. In addition, the determining module may be stored as program codes in the memory of the above apparatus, and be called by a processing element of the above apparatus to implement the determining module's function. The implementations of other modules are similar to the implementation of the determining module. In addition, all or part of these modules can be integrated or implemented separately. The processing element described herein can be an integrated circuit that has signal processing capabilities. In the implementation process, each step of the above method or each of the above modules may be completed by an integrated logic circuit of hardware in the processor element or by instructions in the form of software.

For example, the above modules may be one or more integrated circuits configured to implement the above methods, such as one or more application specific integrated circuits (ASICs), or one or more digital signal processors (DSPs), or one or more field programmable gate arrays (FPGAs). As another example, when one of the above modules is implemented by software code invoking of the processing element, the processing element can be a general purpose processor, such as a central processing unit (CPU) or other processors that can invoke program codes. As another example, these modules can be integrated and implemented in the form of a system-on-a-chip (SOC).

In the above embodiments, all or part of the modules may be implemented by software, hardware, firmware, or any combination thereof. When implemented by software, all or part of the modules may be implemented in the form of a computer program product. The computer program product includes one or more computer instructions. When the computer program instructions are loaded and executed on a computer, the processes or functions described in accordance with embodiments of the present application are generated in whole or in part. The computer can be a general purpose computer, a special purpose computer, a computer network, or other programmable apparatuses. The computer instructions can be stored in a computer readable storage medium or transmitted from one computer readable storage medium to another, for example, the computer instructions can be transmitted from a website site, computer, server or data center to another website site, computer, server, or data center by wire (e.g., a coaxial cable, an optical fiber, a digital subscriber line (DSL)) or wireless technologies (e.g., infrared, wireless, microwave, etc.). The computer readable storage medium can be any available media that can be accessed by a computer or a data storage device such as a server, data center, or the like that includes one or more available medium integrations. The available medium may be a magnetic medium (e.g., a floppy disk, a hard disk, a magnetic tape), an optical medium (e.g., a DVD), or a semiconductor medium (e.g., a solid state disk (SSD)) or the like.

Figure 13:
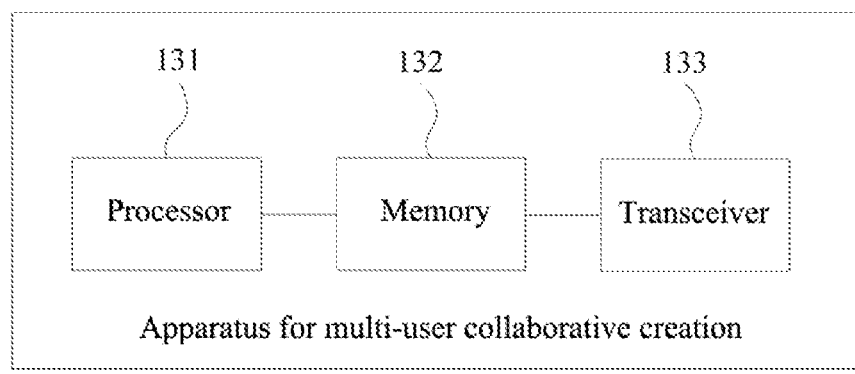
FIG. 13 is a structural schematic diagram of Embodiment 4 of an apparatus for multi-user collaborative creation according to an embodiment of the present application.

FIG. 13 is a structural schematic diagram of Embodiment 4 of an apparatus for multi-user collaborative creation according to an embodiment of the present application; as shown in FIG. 13, the apparatus for multi-user collaborative creation may include a processor 131, a memory 132 and a computer program stored on the memory 132 and executable on the processor 131.

Optionally, when the processor 131 executes the program, the implementation scheme of the second terminal in the method embodiments shown in FIG. 2 and FIG. 3, or the steps performed by the second terminal in the embodiment shown in FIG. 9 are implemented.

Or, when the processor 131 executes the program, the implementation scheme of the first terminal in the method embodiments shown in FIG. 4 to FIG. 6, or the steps performed by the first terminal in the embodiment shown in FIG. 9 are implemented.

Or, when the processor 131 executes the program, the implementation scheme of the server in the method embodiments shown in FIG. 7 and FIG. 8, or the steps performed by the server in the embodiment shown in FIG. 9 are implemented.

Optionally, the live video processing device may further include a transceiver 133. The transceiver 133 may be implemented by a transmitter and a receiver, where the transmitter and the receiver may have independent functions and may be implemented by using an antenna or the like, which will not be limited in the embodiment of the present application. Correspondingly, the processor 131 and the transceiver 133 are configured to execute computer executable instructions to cause the first terminal, the second terminal or the server to perform the respective steps as applied to the method for multi-user collaborative creation described above.

Optionally, an embodiment of the present application further provides a storage medium, where the storage medium stores instructions. The instructions, when run on a computer, cause the computer to perform the implementation scheme of the second terminal, the first terminal, or the server in the method embodiments shown in FIG. 2 to FIG. 9.

Optionally, the embodiment of the present application further provides a chip that runs instructions, where the chip is configured to perform the implementation scheme of the second terminal, the first terminal, or the server in the method embodiments shown in FIG. 2 to FIG. 9.

An embodiment of the present application further provides a program product, where the program product includes a computer program stored in a storage medium, and at least one processor can read the computer program from the storage medium. When executing the computer program, the at least one processor can implement the implementation scheme of the second terminal, the first terminal, or the server in the method embodiments shown in FIG. 2 to FIG. 9.

The term "plurality" as used herein refers to two or more. The term "and/or" herein is merely used for describing an association between the associated objects, indicating that there may be three relationships. For example, A and/or B, may indicate 3 situations, i.e., A exists independently, both A and B exist simultaneously, B exists independently. In addition, the character "/" in this article generally indicates that the associated objects have a relationship of "or"; in the formula, the character "/" indicates that the associated objects have a relationship of "division"

It is to be understood that the various reference numbers in the embodiments of the present application are only for convenience of description but not to be construed as limiting the scope of the embodiments.

It should be understood that, in the embodiments of the present application, the sequence numbers of the foregoing processes do not mean the execution order, and the execution order of each process should be determined by its function and internal logic. The sequence numbers should not be construed as limiting the implementation process of the embodiment of the present application.

Finally, it should be noted that the above embodiments are only for explaining the technical solutions of the present application, but not for limiting the technical solutions; although the present application has been described in detail with reference to the foregoing embodiments, those skilled in the art should understand that the technical solutions described in the foregoing embodiments may be modified, or some or all of the technical features may be equivalently substituted; and the modifications or substitutions do not make the essence of the corresponding technical solutions deviate from the scope of the embodiments of the present application.

What is claimed is:

1. A method for multi-user collaborative creation, wherein the method is applied to a second terminal, the method comprising:
    obtaining a three-dimensional (3D) creation created by a first creator from a server, the 3D creation comprising at least one creation element, the at least one creation element being determined by a first terminal corresponding to the first creator;
    obtaining creation information corresponding to each creation element according to the 3D creation, the creation information comprising a first creator identifier, wherein the first creator identifier being configured to identify the first creator; and
    determining the first creator corresponding to the each creation element according to the creation information corresponding to the each creation element;
    transmitting a creation modification request to the first terminal corresponding to the first creator, the creation modification request comprising a creation element identifier, a modification scheme and a second creator identifier, the second creator identifier being configured to identify a second creator who requests to modify the 3D creation;
    receiving a creation modification response returned by the first terminal according to the creation modification request, the creation modification response being fed by the first terminal according to a determined result which is obtained by determining whether the modification scheme is appropriate according to the creation element identifier and the second creator identifier, the creation modification response comprising approval of modification of the second terminal or disapproval of modification of the second terminal; and
    when the creation modification response is the approval of modification, modifying the creation element corresponding to the creation element identifier according to the modification scheme and associating the modified creation element with the second creator identifier corresponding to the second terminal to obtain a first association relationship, to enable other creators, who want to modify the modified creation element, ask for approval of the second creator through the second creator identifier;
    uploading the modified 3D creation and the first association relationship to a server to enable the server to store the modified 3D creation, wherein the modified 3D creation is updated by the second terminal using the modified creation element.

2. An apparatus for multi-user collaborative creation, wherein the apparatus is applied to a second terminal, the apparatus comprising a processor and a computer-readable medium for storing program codes, which, when executed by the processor, cause the processor to implement the method according to claim 1.

3. A non-transitory storage medium, wherein the storage medium stores instructions that, when run on a computer, cause the computer to perform the method according to claim 1.

4. The method according to claim 1, wherein the 3D creation has already been uploaded by the first terminal to the server before being requested by the second terminal.

5. The method according to claim 1, wherein the 3D creation is created according to a gesture action of the first creator in a 3D space.

6. The method according to claim 1, wherein the obtaining a 3D creation created by a first creator comprises:
    transmitting a creation obtaining request to the server, the creation obtaining request comprising a 3D creation identifier and the second creator identifier, the 3D creation identifier being used by the server to determine the 3D creation requested by the second terminal; and
    receiving the 3D creation transmitted by the server according to the 3D creation identifier and the second creator identifier.

7. The method according to claim 1, wherein before uploading the modified 3D creation to the server, the method further comprises:
    associating the modified creation element with a modification time to obtain a second association relationship;
    the uploading the modified creation element and the first association relationship to the server comprising:

uploading the modified 3D creation, the first association relationship and the second association relationship to the server.

\* \* \* \* \*